United States Patent

Boie

[11] Patent Number: 6,140,737
[45] Date of Patent: Oct. 31, 2000

[54] APPARATUS AND METHOD FOR CHARGE NEUTRAL MICRO-MACHINE CONTROL

[75] Inventor: Robert A. Boie, Westfield, N.J.

[73] Assignee: Lucent Technologies Inc., Murray Hill, N.J.

[21] Appl. No.: 09/453,123

[22] Filed: Dec. 2, 1999

Related U.S. Application Data

[60] Provisional application No. 60/158,512, Oct. 8, 1999.

[51] Int. Cl.$^7$ ...................................................... H02N 1/00
[52] U.S. Cl. ........................ 310/309; 318/116; 310/308; 361/235
[58] Field of Search ................................... 310/308, 309; 361/207, 235; 335/78, 127, 128; 359/290, 292, 295; 318/116

[56] References Cited

U.S. PATENT DOCUMENTS

| | | | |
|---|---|---|---|
| 5,768,007 | 6/1998 | Knipe et al. | 359/290 |
| 5,768,009 | 6/1998 | Little | 359/293 |
| 5,869,916 | 6/1998 | Suzuki et al. | 310/309 |
| 5,872,313 | 2/1999 | Zarabadi et al. | 73/497 |
| 5,914,553 | 6/1999 | Adams et al. | 310/309 |
| 5,923,798 | 7/1999 | Aksyuk et al. | 385/19 |
| 5,945,898 | 8/1999 | Judy et al. | 335/78 |
| 5,986,381 | 11/1999 | Hoen et al. | 310/309 |

*Primary Examiner*—Nick Ponomarenko
*Assistant Examiner*—B Mullins

[57] ABSTRACT

An electrostatic actuator and a method for actuating a micro-machine structure. The micro-machine structure has a stationary part and a movable part that is relatively movable between a rest position and an activated position and is resiliently connected to the stationary part. The stationary part and the movable part form a flexible sub-structure having a resonant frequency. The actuator comprises a first electrode disposed on the stationary part and a second electrode disposed on the movable part. The actuator also includes a wave generator, connected to the first electrode and the second electrode, for generating an alternating voltage signal to the first electrode and a reference voltage signal to the second electrode so as to impart an electrostatic force between the stationary and movable parts and to move the movable part from the rest position to the activated position. The electrostatic force for fixed amplitude wave has a constant force component and a vibratory force component. The alternating voltage signal has a frequency sufficiently higher than the resonant frequency of the sub-structure so that the vibratory force component is absorbed by the sub-structure and the activated position remains substantially constant. The actuator motion or position is controlled by varying the amplitude of the alternating voltage signal.

8 Claims, 1 Drawing Sheet

APPARATUS AND METHOD FOR CHARGE NEUTRAL MICRO-MACHINE CONTROL

RELATED APPLICATION

This application claims priority from U.S. Provisional Patent Application Ser. No. 60/158,512, which was filed on Oct. 8, 1999.

BACKGROUND OF THE INVENTION

1. Field of the Invention

The present invention relates to micro-machined structures and, more particularly, to a method and an apparatus for selectively actuating movement of micro-machined structures using electrostatic forces.

2. Description of the Related Art

Typically, silicon micro-machine structures are actuated by electrostatic attractive forces between resiliently mounted elements maintained at different voltage potentials. The attractive force between the elements is proportional to the square of the voltage difference. Nevertheless, insulators disposed between or near the elements tend to accumulate charges. These accumulated or residual charges may result from gas ions accumulated on the surfaces of the elements or the redistribution of charges in the insulators as a result of the electric field. Consequently, the elements drift apart over time even though the applied voltage potentials remain the same, thereby decreasing the accuracy of the actuation mechanism. Such accumulation of charges can reduce or even cancel the applied electric field.

One solution is to recalibrate the actuation mechanism from time to time. But calibration procedures tend to be time-consuming and highly disruptive to a user's normal operations as the systems must be taken off line periodically.

Accordingly, there is a need for an electrostatic actuating mechanism and method for controlling the movement of micro-machines and which does not cause the micro-machines to accumulate charges.

SUMMARY OF THE INVENTION

An object of the present invention is to provide an electrostatic actuating method and apparatus for operating a micro-machine structure that does not induce accumulation of residual charges on the structure.

According to an aspect of the invention, an alternating voltage signal from a voltage driver is applied to the electrodes of the electrostatic actuator at a frequency such that the mechanical structure behaves as if it is driven by a DC voltage signal.

According to another aspect of the invention, the alternating voltage signal is a sinusoidal wave having a frequency higher than one-half the natural or resonant frequency of the micro-machine structure.

According to still another aspect of the invention, the alternating voltage signal may be a substantially square-wave signal or sinusoidal-wave signal.

In one embodiment, an alternating voltage signal (i.e., its voltage is reversed periodically with zero volt mean value) is applied to the actuating elements of a micro-machine so that the activated positions of the elements remain substantially constant or fixed relative to each other. The alternating voltage preferably has a period or polarity reversal less than the time required for the elements to accumulate charges so as to avoid charging of the actuators. The requisite frequency or periodicity of the alternating voltage signal is selected as a function of the charging mechanism involved. To avoid vibrating of the micro-machine structure, the frequency of the alternating voltage signal should be sufficiently higher than the natural frequency (or frequencies) of the micro-machine structure so that the oscillating component of the applied electrostatic force is effectively isolated by the resilience of the micro-machine structure.

In another embodiment, a micro-machine structure has a stationary part and a movable part resiliently connected to the stationary part and movable between a rest position and an activated position. The stationary part and the movable part form a flexible sub-structure having a resonant frequency. An actuator comprises a first electrode disposed on the stationary part and a second electrode disposed on the movable part. The actuator includes a wave generator, connected to the first electrode and the second electrode, for generating an alternating voltage signal to the first electrode and a reference voltage signal to the second electrode so as to impart an electrostatic attractive force between the stationary and movable parts for moving the movable part from a rest position to an activated position. The electrostatic attractive force has a constant force component and a vibratory force component that depend on the amplitude of the wave. The alternating voltage signal is adjusted to a frequency such that the frequency of the vibratory component is sufficiently higher than a resonant frequency of the sub-structure so that the vibratory force component is absorbed by the sub-structure and the activated position of the movable part remains depend only on the amplitude of the wave.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
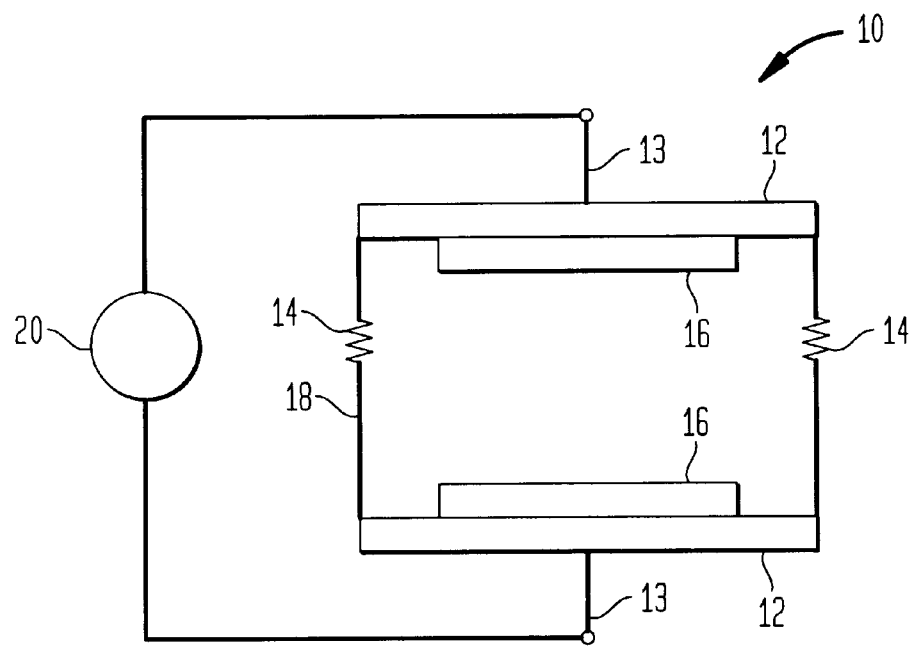
FIG. 1 schematically illustrates an electrostatic actuator mechanism constructed in accordance with one embodiment of the present invention.

FIG. 1 depicts an embodiment of an inventive electrostatic actuator mechanism 10 for moving elements 12 of a micro-machine structure wherein the elements are resiliently connected to each other. The elements 12 may, for example, be cooperative parts of a micro-machine structure and are conductive so that a voltage potential can be applied thereto. The elements 12 are preferably resiliently connected to each other by springs 14 that act in oposition to the attractive electrostatic force so as to keep the elements 12 apart. One or more of the elements 12 move toward each other (to an activated position) as the electrostatic force is increased and move apart from each other (toward a rest position) as the force is reduced. Insulators 16 and an air vacuum or gas filled gap 18 may be disposed between the elements 12.

Figure 2:
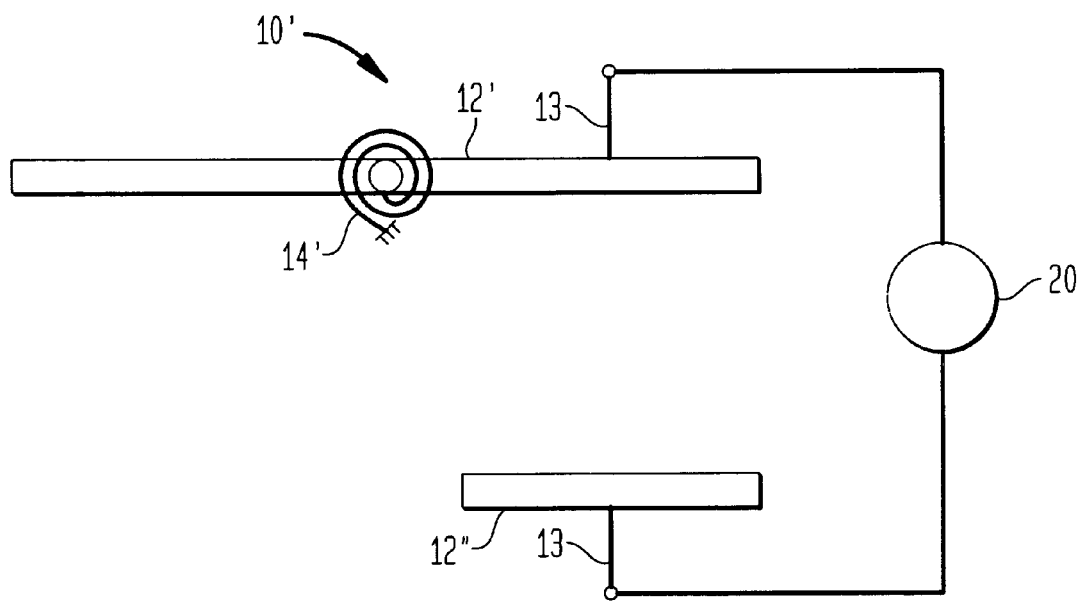
FIG. 2 schematically illustrates an electrostatic actuator mechanism constructed in accordance with another embodiment of the invention.

FIG. 2 schematically depicts another embodiment of an actuator mechanism 10' of the present invention wherein the micro-machine structure includes a pivotable part 12' and a stationary part 12". The pivotable part 12' may, for example, be a portion of a pivotable mirror for reflecting optical signals and the stationary part 12" may, for example, be a portion of the base of the mirror. The pivotable part 12' is preferably resiliently connected to another pivotable part or to the base of the mirror through a rotational spring 14' so that the pivotable part 12' may automatically return to its predetermined rest position from its predetermined activated position when the actuator mechanism 10' is in its OFF state.

Advantageously, the actuator mechanism 10, 10' includes a voltage source 20 connected to the elements 12, 12', 12" through electrodes 13 for applying a first voltage signal to one of the elements 12 and a second voltage signal to another one of the elements 12. Furthermore, the voltage source 20 varies or alternates the voltage or amplitude of the first or the second voltage signals over a period of time such that the electrostatic attractive force imparted to the elements 12 has a constant force component and a vibrating force component during such period. The alternating voltage signal preferably has these important characteristics or parameters: (1) it generates a voltage difference between the first and the second voltage signals such that the difference has a zero mean value so as to avoid charging effects; (2) its frequency is chosen to be high enough to avoid unwanted motion in the micro-machine structure; and (3) has a period sufficiently shorter than the time for accumulating charges on the elements 12, 12', 12" or the insulators 16. Thus, control of the voltage or amplitude of the alternating voltage signal controls the positioning or motion of the elements 12. The voltage source 20 preferably includes a wave generator for supplying a sinusoidal or a square-wave voltage signal to the elements 12.

As will be appreciated by persons of ordinary skill in the art, and based on the disclosure herein, the electrostatic attractive force generated by a fixed-amplitude voltage source has a static force component and a vibrating force component. The frequency of the alternating voltage signal should be selected such that the frequency of the vibrating force component is sufficiently higher than the natural frequency of the elements-spring structure of the micro-machine so that the vibrating force component is substantially absorbed or isolated by the structure and the activated position(s) of one or more of the elements remain substantially constant.

For a sinusoidal voltage signal, $V(t)=B \sin(\omega t)$, where B is the signal amplitude, the electrostatic force is proportional to $(B^2/2)(1-\cos(2\omega t))$. Note that the vibrating component of force has a frequency that is twice the frequency of the voltage signal. The activated position(s) of the elements depends only on the voltage amplitude B to the extent that the vibrating force component $(-B^2 \cos(2\omega t))/2$ can be isolated by the elements-spring structure. The vibrating force component can be isolated by the structure when the vibrating force component at angular frequency $2\omega$ is sufficiently high relative to the natural angular frequency of the actuator so that the ratio of output motion to input force of the elements-spring structure is sufficiently small.

In a particularly preferred embodiment, the alternating voltage signal is a substantially square-wave signal as the actuator mechanism 10, 10' requires less power to produce the requisite electrostatic force and causes less unwanted motion to the elements-spring structure than does a sinusoidal signal operating at the same frequency; this is a direct result of the force being proportional to the square of the drive waveform. The square of a square-wave signal of amplitude C with the transition or rise time $\tau$ is, in the limit of $\tau=0$, a constant value $C^2$ and thus provides actuator control through varying drive signal amplitude. Since the force output depends only on the amplitude C, the actuator mechanism 10, 10' may theoretically be operated at any frequency. However, a real-life (as opposed to a theoretical) square-wave drive has a non-zero $\tau$. Accordingly, the resulting force drive has, in addition to a constant component $C^2$, a train of pulses having amplitude $C^2$, width $\tau$, and frequency $f$ at twice the drive waveform frequency. The constant force component provides the desirable displacement to the elements-spring structure while the train of pulses may cause the structure to exhibit (unwanted) vibratory motion. It is noted that a square wave drive will excite unwanted motion less than a sine-wave drive at the same frequency by a factor of $\tau f$. The square wave drive also requires lower drive amplitude than that required by a sine-wave drive for $\tau f \leq 3/16$.

In another embodiment, the square wave signal is generated at a frequency much lower than the inherent natural frequency of the elements-spring structure. At such a frequency, the rise time $\tau$ of the square wave is short compared to the period of the square wave so that the vibratory force component is reduced by the corresponding small factor represented by the product of $\tau$ and $f$. This control scheme is particularly useful for an elements-spring structure having a resonant frequency in the range of kilohertz where the charging constants are measured in terms of seconds, or even minutes. Thus, the alternating frequency for preventing charging of the actuators need only have a period that is sufficiently short as compared to the charging time of the actuators.

While there have been shown and described and pointed out fundamental novel features of the invention as applied to preferred embodiments thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A method of actuating a micro-machine structure including a first part and a second part resiliently mounted to the first part for relative movement of the first and second parts, and the structure having a resonant frequency, the method comprising the steps of:
   (a) applying a first voltage signal to the first part so that the first part attains a first voltage potential;
   (b) applying a second voltage signal to the second part so that the second part attains a second voltage potential different from the first voltage potential to thereby impart an electrostatic attractive force between the first and second parts and effective for moving one of the first and second parts relative to the other of the first and second parts from a rest position to an activated position; and (c) varying the voltage of one of the first and second applied voltage signals over a period of time such that the mean value of the voltage difference between the first and second applied voltage signals is zero while the imparted electrostatic attractive force has a constant force component and a vibrating force component during said period of time, the vibrating force component having a frequency higher than the resonant frequency of the structure such that the vibrating force component is sufficiently absorbed by the structure and the activated position of said one of the first and second parts remains substantially constant, so as to control positioning of the first and second parts of the micro-machine structure.

2. The method of claim 1, wherein said voltage varied one of the first and second voltage signals comprises a square wave signal whose amplitude controls positioning of the first and second parts of the micro-machine structure.

3. The method of claim 1, wherein said voltage varied one of the first and second voltage signals is a sinusoidal wave signal whose amplitude controls positioning of the first and second parts of the micro-machine structure.

4. A method of actuating a micro-machine structure including a first part and a second part resiliently mounted to the first part for relative movement of the first and second parts, and the structure having a resonant frequency and a charging time, the method comprising the steps of:

(a) applying a reference voltage signal to the first part so that the first part attains a first voltage potential;

(b) applying a square-wave voltage signal to the second part so that the second part attains a second voltage potential different from the first voltage potential, to thereby impart an electrostatic force between the first and second parts and relatively move one of the first and second parts from a rest position to an activated position, the square-wave voltage signal having a rise time $\tau$ and a frequency $f$; and (c) varying the voltage of the zero mean value square-wave voltage signal over a period of time so that the imparted electrostatic force has a constant force component and a vibrating force component during said period of time, the vibrating force component having a period that is short compared to the charging time, so as to control positioning of the first and second parts of the micro-machine structure.

5. An actuator for a micro-machine structure having a stationary part and a movable part resiliently connected to the stationary part and relatively movable between a rest position and an activated position, the stationary part and the movable part forming a sub-structure having a resonant frequency, the actuator comprising:

a first electrode connected to the stationary part;

a second electrode connected to the movable part; and a wave generator, connected to said first electrode and said second electrode, for generating an alternating voltage signal to one of said first and said second electrodes and a reference voltage signal to the other of said first and said second electrodes so as to impart an electrostatic force between the stationary and movable parts and to move the movable part relative to the stationary part from the rest position to the activated position, the electrostatic force having a constant force component and a vibratory force component, and the alternating voltage signal having a frequency sufficiently higher than the resonant frequency of the sub-structure so that the vibratory force component is absorbed by the sub-structure and the activated position remains substantially constant.

6. The actuator of claim 5, wherein the alternating voltage signal comprises a square wave signal.

7. The actuator of claim 5, wherein the alternating voltage signal comprises a sinusoidal wave signal.

8. The actuator of claim 5, wherein the stationary part and the movable part are pivotably connected to each other so as to form a pivotable mirror.

* * * * *